UNITED STATES PATENT OFFICE.

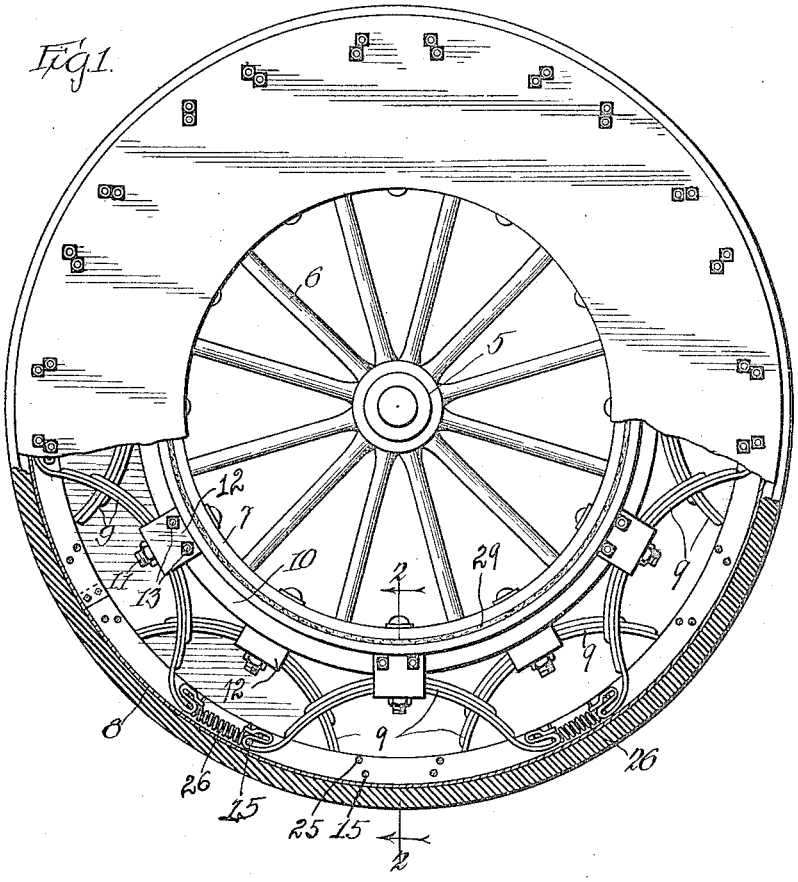

FRANK CARTER, OF CHICAGO, ILLINOIS, ASSIGNOR TO PEERLESS WHEEL COMPANY, OF CHICAGO, ILLINOIS, A CORPORATION OF DELAWARE.

SPRING-WHEEL.

1,222,734.  Specification of Letters Patent.  Patented Apr. 17, 1917.

Application filed May 20, 1916. Serial No. 98,945.

*To all whom it may concern:*

Be it known that I, FRANK CARTER, a citizen of the United States, residing at Chicago, in the county of Cook and State of Illinois, have invented certain new and useful Improvements in Spring-Wheels, of which the following is a specification.

My invention relates to spring or elastic wheels and has for its object the provision of a simple and efficient wheel of the character mentioned. Other objects will appear hereinafter.

An embodiment of my invention is shown in the accompanying drawing forming a part of this specification, and in which—

Figure 1 is a side elevation of a wheel embodying my invention, with a portion broken away to show underlying parts.

Fig. 2 is an enlarged section taken on line 2—2 of Fig. 1.

Fig. 3 is an enlarged fragmental section showing the connection of a spring with the rim construction, and Fig. 4 is an enlarged section taken on line 4—4 of Fig. 3.

My invention is capable of embodiment in all forms of vehicle wheels and is especially adaptable for motor-driven vehicles and is readily applicable both to pleasure cars and to trucks of such motor-driven vehicles.

Referring more particularly to the drawing, a hub 5 of any conventional or preferred design is provided with the usual or any preferred spokes 6 secured thereto in the usual manner. At the ends of the spokes is provided a felly 7 which may also be of any preferred or usual design. I preferably form my wheel with more than one row or series of leaf springs between the felly 7 and the rim 8, but it is understood that only one row of springs may be provided, if so desired. In the form shown two rows of substantially semi-elliptical leaf springs 9 are illustrated. On the felly 7 is a constricted portion 10 to which the springs are secured. When two rows of springs are provided two of the constricted portions 10 are provided on the rim. It will be understood that one constricted portion 10 is provided with each row or series of springs around the wheel.

The springs 9 may have any number of leaves desired and may be secured to the felly 7 in any desired manner. The form I have shown comprises a bolt 11 which passes radially through the felly and spring 9 with a strap or stirrup 12 extending around the central portion of the spring and secured to the constricted portion 10 by means of bolts 14. This connection forms a very rigid construction and one which efficiently holds the spring in operative position.

The ends of the springs are movably or slidably connected with the rim 8. The rim 8 is preferably channel form or U-shaped in cross section having a central cylindrical portion 8′ and leg portions 8″ extending radially of the wheel. The spaces between the leg portions 8″ are divided by annular members 14 corresponding in number to the number of series of springs used in the construction. In the form shown where two rows of springs are used only one dividing member 14 is used. The dividing member 14 is spaced from the leg portions 8″ by bolts 15 which have shoulders 16 engaging the member 14 and tubular members or bushings 17 which are clamped against the member 14 by the nuts 18 of the bolts 15. With this construction it will be clear that the member 14 will be spaced rigidly between the leg portions 8″ and cannot clamp the spring ends which are mounted on the bolts 15.

Each end of each spring 9 is bent back upon itself a short distance, as indicated at 19 in Fig. 3, forming a loop 20 through which a bolt 15 passes to provide a movable connection between the rim 8 and the end of spring 9. This permits free flexing of the spring 9 in use. The portion 19 of the spring is again bent as at 21, Fig. 3, providing a loop 22 so that the portion 23 of the spring extends in the same general direction as the central portion of the spring 9. The extreme end of each spring end extends beyond the loop 20 of the spring and is provided with a perforation 24, the purpose of the perforation being described later. Through each of the loops 22 is a bolt 25 which assists in supporting and connecting the end of spring 9 with the rim 8. The double connection provided by loops 20 and 22 on bolts 15 and 25 form a very efficient connection between the spring end and rim.

Between each pair of adjacent ends of springs 9 I provide springs 26, which are shown as being helical but may be of any other preferred form. The ends of the springs 26 are connected with the ends of springs 9 so that the springs 26 will tend to resist longitudinal movements of the ends of springs 9 in the channel of rim 8. In the form shown the ends 27 of the helical spring 26 pass through perforations 24 of the springs 9 providing means whereby the springs 26 resist movements of the ends of springs 9 both toward and away from each other.

As a means for preventing dirt and foreign materials from entering the space between the rim 8 and felly 7 I provide annular plates 28 which are secured to the rim 8 by the bolts 15, as clearly indicated in Figs. 2 and 4. The felly 7 may be provided with gaskets 29, see Fig. 2, as a further precaution against foreign material passing between the felly 7 and the plates 28.

While I have illustrated and described the preferred form of my construction, I do not desire to be limited to the precise details set forth, but desire to avail myself of such variations and changes as come within the scope of the appended claims.

I claim:

1. A wheel comprising a felly; a rim movably associated with the felly and having a channel U-shaped in cross section in its inner periphery; leaf springs having their central portions secured to the felly and their end portions formed in loops and disposed in said channel with perforations in said spring ends; bolts passing through the channel and said loops connecting the springs with the rim; and coil springs disposed in the channel between said leaf springs with their ends disposed in the perforations of said leaf springs for resisting movements of the leaf spring ends both toward and away from each other, said channel being in engagement with the sides of the coil springs holding the latter against displacement.

2. A wheel comprising a felly; a rim substantially concentric with the felly; a series of leaf springs secured at their central portions to the felly, the end portions of each spring being bent back upon themselves forming loops and having parts of said bent back portions again bent into the same general directions of the central portions of the spring with perforations in their extreme ends; helical springs having their ends extending through the perforations of two adjacent leaf spring ends resisting the circumferential movements of the latter in the rim; and means on the rim engaging said loops for connecting the leaf springs to said rim.

3. A wheel comprising a felly; a rim movably associated with the felly; leaf springs having portions rigidly secured to the felly and loops provided in their ends adjacent said rim; pins mounted in said rim and disposed in said loops adjustably connecting the leaf springs with said rims; and coil springs connected between adjacent ends of the leaf springs resisting movements of said leaf springs toward and away from each other.

In testimony whereof I have signed my name to this specification, on this 18th day of May A. D. 1916.

FRANK CARTER.

Copies of this patent may be obtained for five cents each, by addressing the "Commissioner of Patents, Washington, D. C."